US009138304B2

(12) United States Patent
Beckman

(10) Patent No.: US 9,138,304 B2
(45) Date of Patent: Sep. 22, 2015

(54) BITE-ACTUATED TOOTH CLEANING TECHNIQUES

(76) Inventor: Christopher V. Beckman, New York, NY (US)

( * ) Notice: Subject to any disclaimer, the term of this patent is extended or adjusted under 35 U.S.C. 154(b) by 90 days.

(21) Appl. No.: 13/570,241

(22) Filed: Aug. 8, 2012

(65) Prior Publication Data

US 2014/0045135 A1 Feb. 13, 2014

(51) Int. Cl.

*A01K 29/00* (2006.01)
*A61D 5/00* (2006.01)
*A46B 9/00* (2006.01)
*A46B 11/00* (2006.01)

(52) U.S. Cl.

CPC . *A61D 5/00* (2013.01); *A46B 9/005* (2013.01); *A46B 11/0041* (2013.01); *A46B 11/0062* (2013.01); *A46B 2200/1086* (2013.01)

(58) Field of Classification Search

CPC .............. A01K 15/026; A01K 15/025; A01K 2300/00; A01K 8/24
USPC ....................................... 119/709, 710; 433/1
See application file for complete search history.

(56) References Cited

U.S. PATENT DOCUMENTS

| | | | | |
|---|---|---|---|---|
| 4,802,444 | A * | 2/1989 | Markham et al. | 119/710 |
| RE34,352 | E * | 8/1993 | Markham et al. | 119/710 |
| 5,857,431 | A * | 1/1999 | Peterson | 119/710 |
| 5,944,516 | A * | 8/1999 | Deshaies | 433/1 |
| 6,148,771 | A * | 11/2000 | Costello | 119/709 |
| 6,415,741 | B2 * | 7/2002 | Suchowski et al. | 119/711 |
| 6,739,287 | B1 * | 5/2004 | Sarantis | 119/709 |
| 2004/0216693 | A1 * | 11/2004 | Handelsman | 119/709 |
| 2007/0015100 | A1 * | 1/2007 | Morris | 433/1 |
| 2011/0094450 | A1 * | 4/2011 | Chamberlain | 119/72 |
| 2011/0290197 | A1 * | 12/2011 | Koo et al. | 119/710 |

* cited by examiner

*Primary Examiner* — Timothy D Collins
*Assistant Examiner* — Jessica Wong

(57) ABSTRACT

New chewing-actuated teeth cleaning techniques are provided. In some aspects of the invention, a device with bite-actuated cleaning features is provided, which may comprise, tooth-guiding channels and variable openings enabling the variable bite-actuated application of a dentifrice for bite-actuated scrubbing. In further aspects, internal springs and the tension of surrounding material drive bite actuation of protrusions. In other aspects, intermediate antechambers, and/or interstitial fluid, gel or other medium, aid in enabling re-sealing an inner chamber following penetration of the CleanChew. This aspect may also be applied to a variety of related arts, including but not limited to pneumatic tires, to aid in remediating gas or fluid leaks from piercing.

17 Claims, 7 Drawing Sheets

BITE-ACTUATED TOOTH CLEANING TECHNIQUES

FIELD OF THE INVENTION

The present invention relates to the fields of animal tooth-cleaning devices and dentifrices.

BACKGROUND

Although the modern toothbrush did not spread throughout Europe until the 1600s, teeth- and gum-cleaning implements have been in use for many centuries, and date to before recorded history. Typically, in the modern era, a toothbrush includes a handle connected to a set of round-ended, flexible bristles, and is used with toothpaste or other dentifrice and water to clean teeth and gums. In the United States, toothpastes usually include a soap for cleaning and a fluoride compound, for its anti-cavity and pro-mineralization properties to protect teeth from decay. Toothpaste is usually not ingested, and may be poisonous to ingest, although "natural ingredient," such as enzymatic and other toothpaste alternatives have been developed that may be safer for animals to ingest. Although the safety and efficacy of many specific dentifrices may be debated, the overall health and hygiene benefits of brushing teeth with a toothbrush and a dentifrice is widely accepted and is part of the ordinary routine of a vast majority of people in the most developed countries.

Non-human animals are known to resist having their teeth cleaned by toothbrush because they do not understand its benefits and dislike the sensation. Thus, chewable teeth- and gum-cleaning implements, such as rawhide strips, have been provided to animal pets for many years, to assist in cleaning their teeth. Nevertheless, veterinarians typically view such implements as supplementary if anything, and recommend that mammalian pet owners, especially dogs and cats, brush their pet's teeth with a toothbrush as well, to assist in maintaining oral hygiene and preventing tooth decay. Neglected pet teeth, with no regular manual brushing, and even with some traditional chewing implements, can be very expensive to remediate. Veterinarians may charge $700 or more for cleaning neglected pet teeth, and the pet teeth may still not be restored after such procedures.

SUMMARY OF THE INVENTION

New chewing-actuated teeth cleaning techniques are provided. In some aspects of the invention, an implement with bite-actuated tooth cleaning aspects known and branded as a CLEANCHEW™ is provided, which may comprise tooth and gum brushing protrusion and/or bite-guided channel opening pairings or sets, which channel pairings or sets may include features, projections and/or spacers and one-way valves to permit the biting-actuated release of dentifrice from an inner chamber. In further aspects of the invention, internal springs and the tension of surrounding material aid in creating bite actuation. In still other aspects of the invention, movable bite-actuated and/or motor-actuated members conform an elastomeric or flexible outer layer with additional sub-features that aid in teeth and oral cavity cleaning.

In other aspects of the invention, an interstitial fluid, gel or other medium, which may or may not be present in a separate interstitial layer defined by a lining, and which may or may not include a dentifrice and may or may not change its viscosity, hardness and other properties upon contact with air, aids in enabling re-sealing an inner chamber following penetration of the CLEANCHEW. Outside of that interstitial layer, an additional interstitial layer containing a gas, fluid or other agent that hardens or congeals with or causes to harden or congeal, the interstitial fluid, gel or other medium within the interstitial layer, may be included and, preferably, is comprised of chambers, locks or angled channels that maintain coverage, pressure and/or mixing between the fluids, gels or other media of the two interstitial layers at the point of perforation of a mutual wall, despite a perforation of other walls of the layers. This aspect may also be applied to a variety of other related arts, including but not limited to pneumatic and other tires, to aid in remediating fluid leaks from piercing or other deformation of a pneumatic tire structure. For example, in the instance of a tire, a chamber above each possible point of perforation may have a gradual drain in its wall at a point just above the possible point of perforation, allowing the slow dousing of the perforation with the combined-hardening component in the outer interstitial layer. The fluid, gel or other medium in the outer interstitial layer may also have a signal dye to indicate that the tire has been compromised, while maintaining pressure due to the resulting seal from hardening or congealing by mixing of the two layers of fluid, gel or other medium.

Unless otherwise indicated, the following terms have the specific meaning described herein:

A "CLEANCHEW," in addition to its ordinary meaning, if any, and special meaning in the art to which it pertains, means each of the following aspects, both alone and in each possible combination, as if separately set forth: an object, preferably comprising an elastomeric or other pliant, flexible or rebounding solid material, that may be chewed and/or bitten by an animal and, due to such chewing and/or biting either or both: (1) releases a fluid, gel, liquid and/or dentifrice from a contained cavity or other feature of the CLEANCHEW in the direction of outer or scrubbing features of the CLEANCHEW or of the teeth or other oral cavity features of the animal; and/or (2) leads to and/or actuates scrubbing or cleaning by protrusions or other features on the outer surface of the object. In addition or alternatively, a CLEANCHEW may comprise a refillable inner chamber(s) variably containing dentifrice and/or any animal-bitable object that may aid in the animal's oral hygiene.

DETAILED DESCRIPTION OF THE INVENTION

Figure 1:
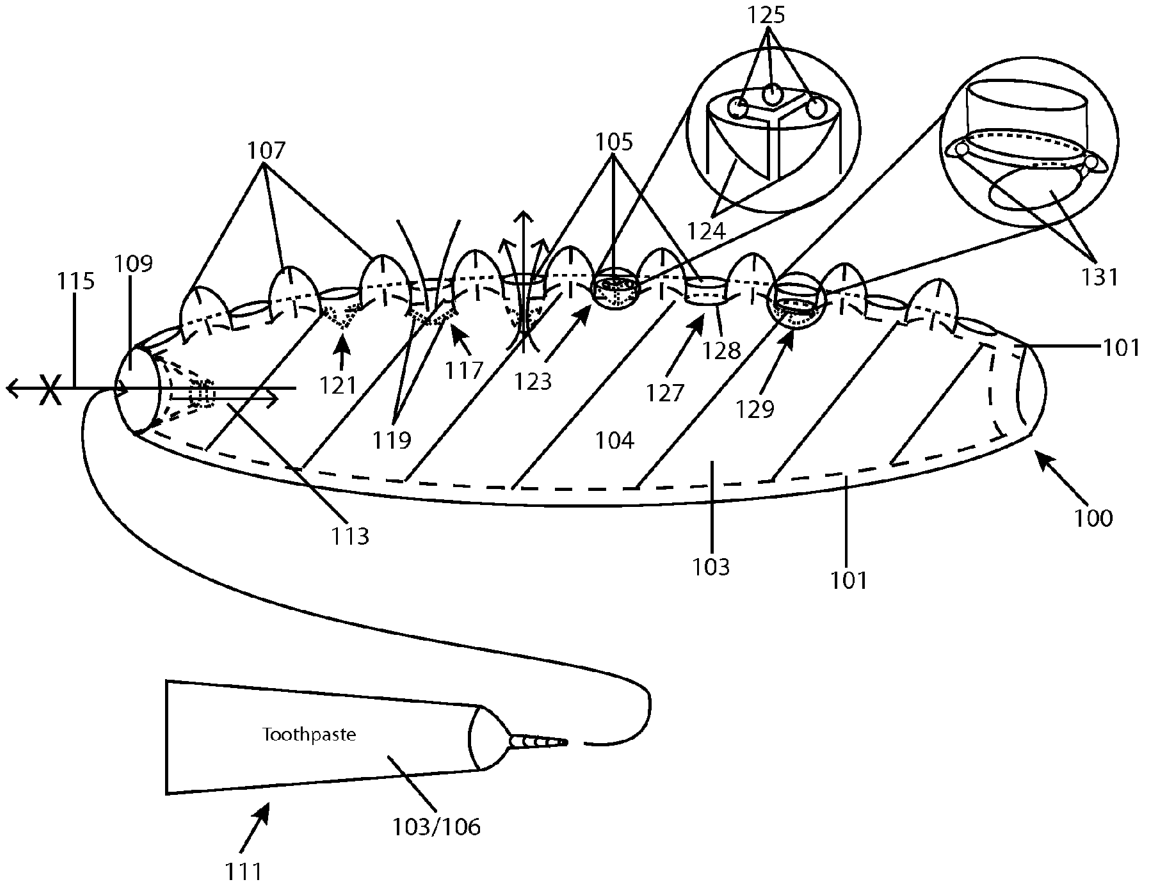
FIG. 1 is a partial illustration of some components of a CLEANCHEW and incorporated dentifrice, in accordance with aspects of the present invention.

FIG. 1 is a side-view illustration of a CLEANCHEW bite-actuated cleaning system 100 for mammalian pets. The entire CLEANCHEW is designed to be safely bitten by a typical mammalian pet, and preferably is small enough that a pet's jaws may encompass at least its narrowest widths and, as a result, dispense dentifrice and actuate a scrubbing action to aid in cleaning teeth and the oral cavity of the pet generally. A flexibly, compressible and expandable outer containing layer 101 contains a dentifrice or other cleaning liquid, fluid or gel ("fluid") 103 in a cavity 104, which is variably dispensable to assist in cleaning the oral cavity of a pet, preferably, a mammalian pet. As will be explained in greater detail below, fluid 103 may be dispensed to the oral cavity of a mammalian pet by biting action, via bite-dispensing, cleaning-featured openings, such as those examples shown as 105, that are designed to accept variably-sized biting teeth. In addition, projections and/or textures, such as projections 107, provide natural abrasion, massage, polishing and/or scrubbing, also driven by biting action. A refilling port 109 permits the filling or refilling of cavity 104 from a complementarily-shaped intermediate fluid storage container 111, which may contain additional or differing fluid 103 and/or 106 such as, as its label is pictured to indicate, toothpaste. Preferably, port 109 is round, cylindrical or conical or otherwise has radial symmetry and comprises a one-way fluid valve, permitting the influx of fluid as shown by fluid motion arrow 113, but which prevents outward flow of fluid, out of cavity 104 through port 109, as shown by stricken fluid arrow 115.

FIG. 1 illustrates a variety of possible exemplary cleaning-featured openings. For example, opening 117 is an exemplary one-way valve opening, with elastomeric variably cavity enclosing features 119. In a resting state, features 119 converge with one another and prevent the outward flow of fluid from cavity 104. However, if a tooth, such as a mammalian tooth, enters opening 117 deeply enough, or with sufficient lateral pressure against them or surrounding, attached material, features 119 may be pulled or pushed away from one another, permitting the outward flow of fluid. Preferably, the overall design of cleaning featured openings, such as 117, alone or in combination with surrounding material shapes and properties, tends to channel teeth and other biting projections that are pressed against CLEANCHEW 100 substantially into the center of the openings. Another preferred form of cleaning-featured opening is shown as opening 121, and will be discussed in greater detail with reference to FIG. 2.

Another preferred form of cleaning-featured opening is shown as 123, which has a tricuspid one-way valve opening, with three semi-flexible flaps 124 to prevent escape of liquid, fluid or gel 103, unless and until a member, such as a tooth, pushes them away from one another (open) with the aid of optional tooth-action-facing, complementarily-shaped push members 125. 123 is shown in enhanced detail by a second rendering in a zoomed in window in FIG. 1.

Another preferred form of cleaning-featured opening is shown as 127, which comprises a sealing membrane 128 that may be pierced by animal biting and which may be scored to then create flaps that still resist the flow of liquid, fluid or gel 103 out of the CLEANCHEW to some degree, but that then permit 103 to flow onto the teeth and gums of the biting animal. An additional stop-cock or gravity ball valve (such as those used for animal water dispensers, and which close when pointed downward, at the gravitational bottom of the CLEANCHEW, may aid in preventing gravitational draining of the CLEANCHEW.

Another preferred form of cleaning-featured opening is shown as 129, with a zoom window to enhance detail, which comprises multiple hinged or flexible attached leaves 131, each of which, by itself, if driven by outward-flowing liquid, fluid or gel 103, substantially close opening 129, but any or all of which may again be forced open by a biting action or tooth.

Although a limited group of cleaning-featured openings and projections are shown at the top of the CLEANCHEW shown in FIG. 1, it should be understood that such cleaning-featured openings, projections and other cleaning textures and aspects disclosed in this application may cover substantially all bite or oral interfacing surfaces of a CLEANCHEW, or select regions better positioned to affect cleaning of an oral cavity or other cavity of an animal.

Figure 2:
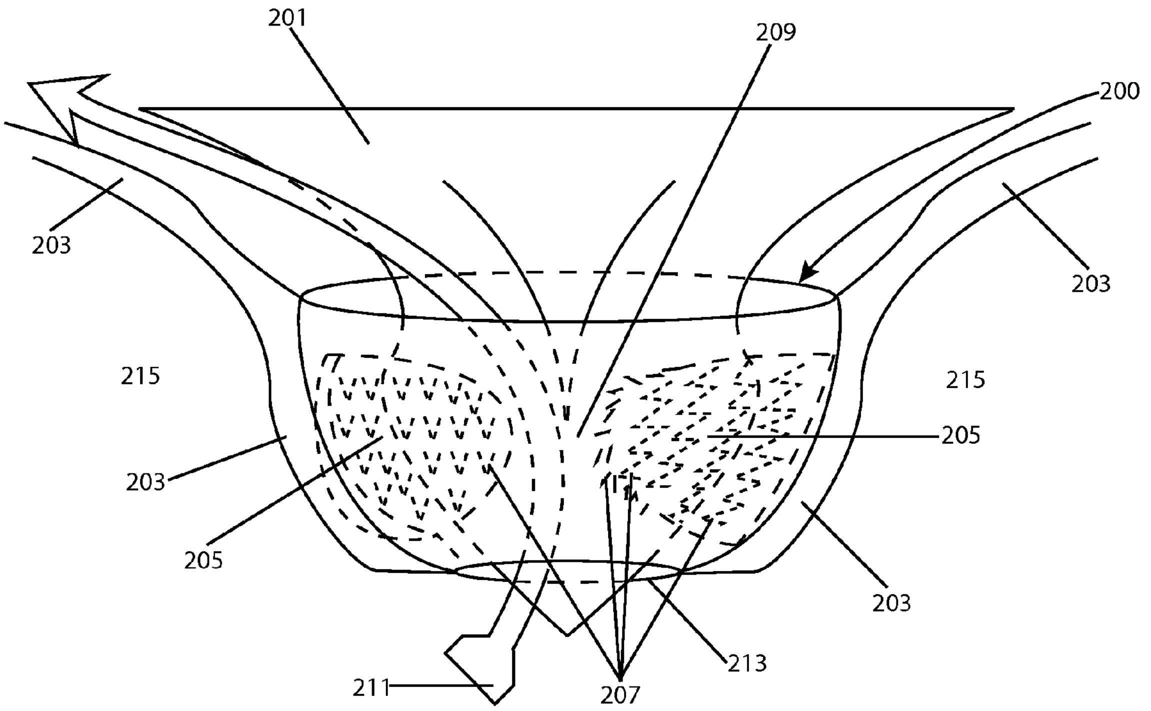
FIG. 2 is a side perspective view of an exemplary cleaning-featured opening 200, in an outer fluid containing layer of a CLEANCHEW, such as the CLEANCHEW shown in FIG. 1.

FIG. 2 is a side perspective view of an exemplary cleaning-featured opening 200, in an outer fluid containing layer of a CLEANCHEW, such as the CLEANCHEW shown in FIG. 1. A mammalian tooth 201 has substantially entered opening 200 due to a biting action of the mammal into and/or against the outer layer of the CLEANCHEW of which it is a part. The outer layer of the CLEANCHEW in which both the cleaning featured opening 200 and the tooth 201 are embedded, is partially shown as 203. Lining the outer surface of cleaning-featured opening 200 are scrubbing surface features 205, which preferably comprise and are at least partially surface-covered by scrubbing and fluid-absorbing projections, such as the projections shown as 207. As the mammal bites, and tooth 201 enters opening 200, projections 207 drag and/or rub against tooth 201, aided by surface tension of the outer surfaces of opening 200, and thereby scrub the surface of tooth 201. Features 205 and/or projections 207 preferably do not cover the entire outer surface of opening 200, and therefore abut surface gaps between them such as that shown as 209. As a result, when a tooth has penetrated opening 200, features 205 and projections 207 further serve as towers which vault the outer surface of opening 200 between them, and temporarily (as long as the tooth remains embedded in opening 200) permit the outward flow of fluid through the resulting volumetric gap, as shown, for example, by fluid motion arrow 211.

An inside port 213 of opening 200 is, when in the CLEANCHEW is in a resting state, substantially closed, and prevents the outward flow of material via elastomeric properties of the material comprised by the opening. However, when a tooth, such as tooth 201, enters opening 200, and therefore stretches its outer surface, port 213 may be pulled open due to the semi-flexible, semi-rigid nature of the material comprised in the outer layer and/or its surface, temporarily permitting the outward flow of fluid contained in cavity 215.

Figure 3:
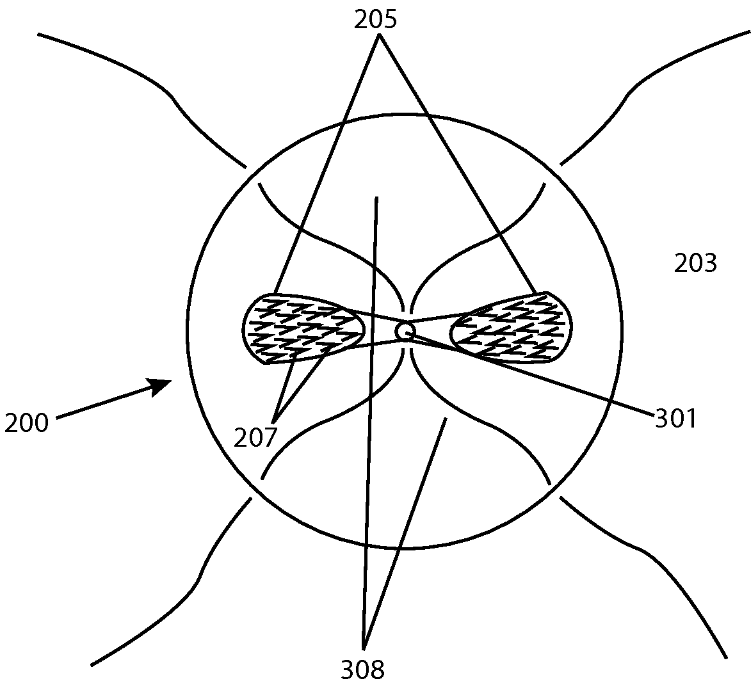
FIG. 3 is a top view of the same cleaning-featured variable opening as that depicted in FIG. 2, and serves to illustrate further exemplary aspects of the present invention.

FIG. 3 is a top view of the same cleaning-featured variable opening 200 pictured in FIG. 2, and serves to illustrate further exemplary aspects of the present invention. In the instance of FIG. 3, a tooth is not shown penetrating opening 200 and, as a result, the inside port, now shown as 301, is substantially closed in its undisturbed, resting conformation, preventing the outward flow (which would correspond with upward, out-of-the-page or positive z-axis flow in the figure) of fluid from the fluid containing side of layer 203, in which cleaning-featured opening 200 is embedded. In this resting conformational state, scrubbing features, such as 205, and projections, such as 207, may be seen in an unobstructed top view, and are contracted into a position substantially tighter (with less space between them) than the volume that would be occupied by a tooth if sufficiently embedded into the opening 200 and between them, which would therefore create tension that could be used for scrubbing against any such tooth. Tooth-guiding channels, exemplary edges of which are shown as 308, are also illustrated more clearly from the top-view, and extend beyond the depression in containing layer 203 comprised by opening 200, illustrating how, regardless of where a tooth happens to land on the surface of a CLEANCHEW, it may be guided into a cleaning-featured opening, such as that featured as 200. Of course, a wide variety of alternate channeling feature shapes may be used, aside from those partially illustrated as sloping downward (into the page of the figure) and towards the center of port 301 in a parabolic or otherwise curved shape, as shown in FIG. 3. Such alternate channeling feature shapes may also comprise abrading or scrubbing sub-features, which, as with other scrubbing features discussed with respect to other figures, may be angled such that their edges better catch the edges of debris and tartar from one, two, more or opposing directions of tooth movement. As such, configurations of such sub-features may be used that are effective regardless of whether a tooth is moving inward or outward (e.g., due to biting, or opening) and/or twisting and scrubbing or brushing can be more efficient.

Figure 4:
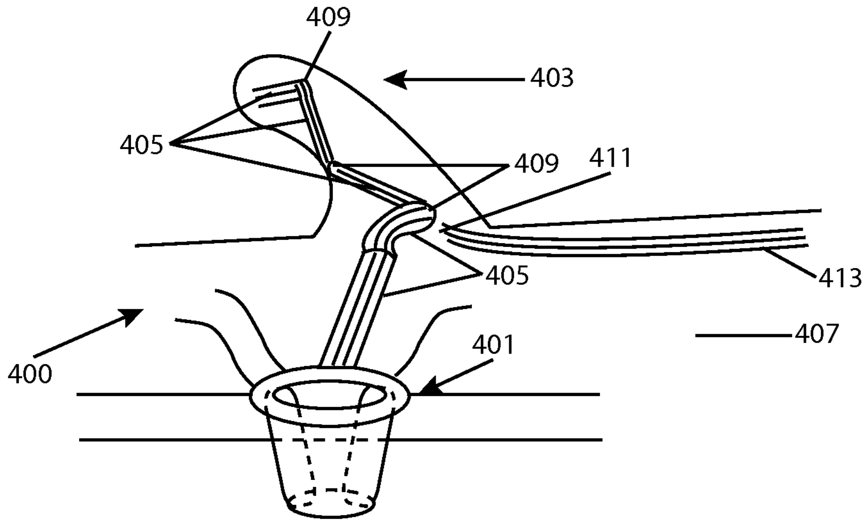
FIG. 4 is a side perspective view of an exemplary cleaning-featured variable opening and bite-induced shifting outward projection combination unit—specifically, a pairing—in its resting conformational structure, prior to biting or tooth penetration of a CLEANCHEW comprising the pairing.

FIG. 4 is a side perspective view of an exemplary cleaning-featured variable opening and bite-induced-shifting scrubbing outward projection combination unit —specifically, a pairing—in its resting conformational structure, prior to biting or tooth penetration of a CLEANCHEW comprising the pairing. In the pairing 400, a cleaning-featured variable opening 401 (for example, such openings of any style discussed elsewhere in this application or as illustrated in FIG. 4), is united with a scrubbing outward projection 403 (again, for example, such projections of any style discussed elsewhere in this application or as illustrated in FIG. 4) and is so united by connecting intermediate material, comprising a banded spring element(s) 405, which has/have both (1) resting and (2) biting-actuated conformational structures, which lead to different resting and biting-actuated conformational structures in surrounding attached flexible layer(s) or surface materials 407, which is, preferably, an elastomeric material or fabric and in which spring element(s) 405 are embedded and/or connected. Spring element(s) 405 are shown in its/their resting conformational state, meaning that the CLEANCHEW comprising it/them is not currently being bitten, or, at least not in or about the location of the pairing 400. In this state, the resting surface tension of surrounding material 407 may lead spring element(s) 405 to be compressed, as by non-deformational bends and/or compressions 409. In addition, tension-reducing or -breaking bend 411 may variably separate or reduce connections or spring aspects in neighboring material, such as neighboring spring element(s) 413 from spring element(s) 405. In this state, that resting surface tension and/or the resting conformational state of spring element(s) 405 and 413 and their variable connections, may lead projection 403 to be in a curved, leftward facing structural state. However, as will be discussed in greater detail with respect to FIG. 5, when bitten, chewed or otherwise physically insulted, alternate conformational states due to changes in surface tension may lead projection 403 to move into a different structural position, and resultantly brush teeth, gums and/or other oral cavity aspects that the projection may be in contact with. As suggested above, a pairing of one exemplary cleaning-featured variable opening and one bite-induced shifting scrubbing outward projection is exemplary only, and triplets, quartets and much more complex interacting physical relationships between variable openings and bite-induced shifting scrubbing outward projections and/or comprised or related spring elements may be, alternatively, used in accordance with aspects of the present invention, including, but not limited to, relationships where bite-driving of more distant openings, or other differently spaced openings, lead to different conformational results for projections that are more likely to effectively brush a surface area of a pet's mouth at that distance. For example, spring bands aligning (actuated conformation) with more distant openings only may lead to brushing in directions conforming with the roof of a mouth, rather than, for example, a curved massaging actuation motion which may be created closer to tooth gums.

Figure 5:
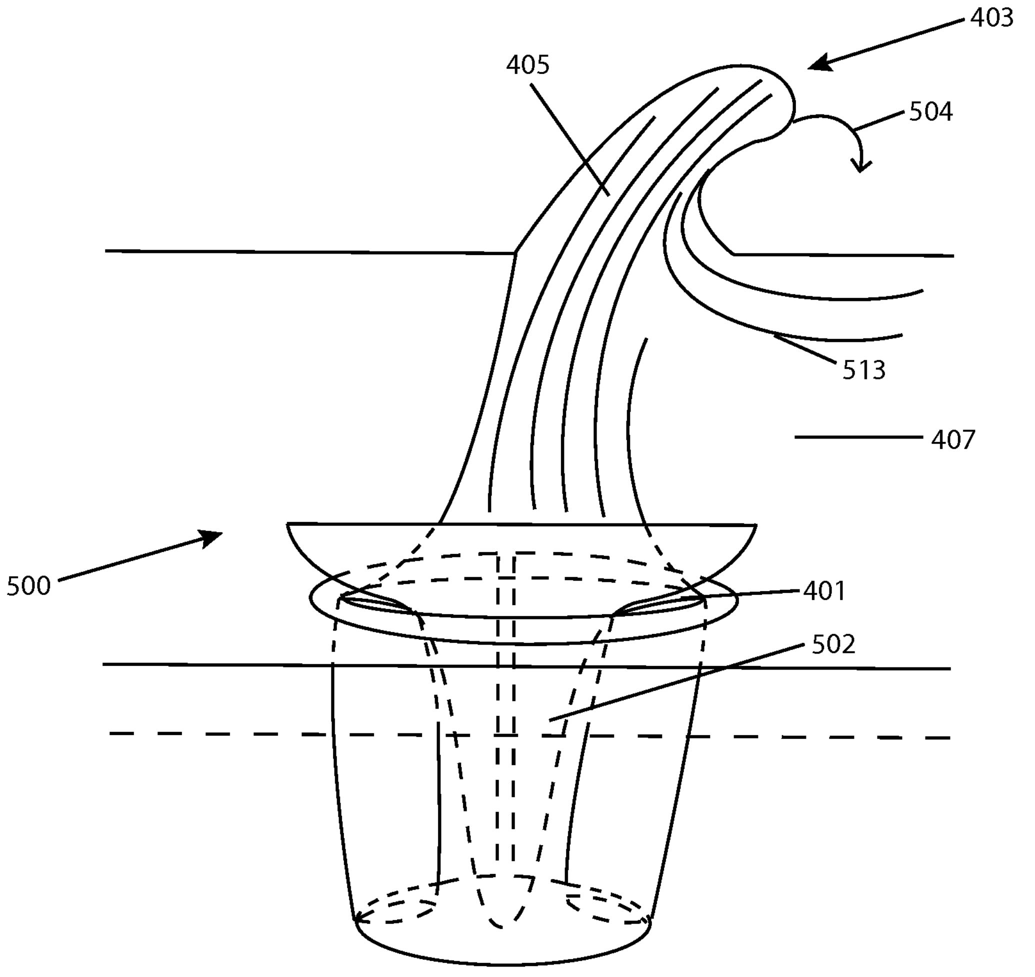
FIG. 5 is another view, from the same perspective, of the same exemplary pairing as that illustrated in FIG. 4, but in another conformation resulting from biting and tooth penetration of the pairing.

FIG. 5 is another view, from the same perspective except that some aspects have been enlarged, of the same exemplary pairing 400, as that illustrated in FIG. 4, but in another structural conformation resulting from biting and tooth penetration of the variable opening 401 of the pairing. Thus, in FIG. 5, a tooth 502 is illustrated as inserted into variable opening 401, creating both downward and outward pressure on opening 401 and creating surface tension in surface materials 407. More specifically, that pressure tends to align banded spring elements 405, to remove conformational folds. More straightened and aligned elements 405 and 413 then approach and achieve a conformational state in which folds disappear and the elements apply a rightward, curving motion in the scrubbing outward projection 403. That motion is illustrated by motion arrow 504, and may aid in scrubbing gums and neighboring teeth.

Spring element(s) 405 preferably have multiple stable resting conformations that may be switched by biting or other interaction with the surface of the CLEANCHEW. In addition, although this application has stressed biting-actuation for causing a shift from and to resting stable or other conformations of spring elements 405, and driving scrubbing projections and features, it should be noted that such spring elements may instead, or in addition, drive dilation and contraction of CLEANCHEW surface variable openings such that, when a projection or other surface feature is sufficiently bent over or pulled sideways or compressed by rubbing against a surface to be cleaned, then and only then are spring elements aligned that cause outward, opening tension on the rims and surfaces of fluid, gel and/or liquid-containing orifices. Also preferably, intermediate fluid, gel and/or liquid-containing antechamber(s), preferably abutting, variably opening into and smaller than a main fluid, gel and/or liquid-containing cavity, and also abutting and sharing the variable opening(s) to the surface of the CLEANCHEW, receive such fluid, gel and/or liquid from the main cavity only by a variable valve which substantially closes during a sufficient scrubbing action that drives surface features sufficiently to cause the spring elements to drive dilation of CLEANCHEW surface variable openings. It should also be noted that, although separate spring elements and outer CLEANCHEW layer materials are discussed, a single material, with spring properties and resting conformational state(s) may instead be used as both the material layer and spring element(s), such that surface deformation or teeth acceptance may drive variable opening of both a main fluid, gel and/or liquid-containing chamber, and/or intermediate antechambers, into CLEANCHEW surface variable openings.

Figure 6:
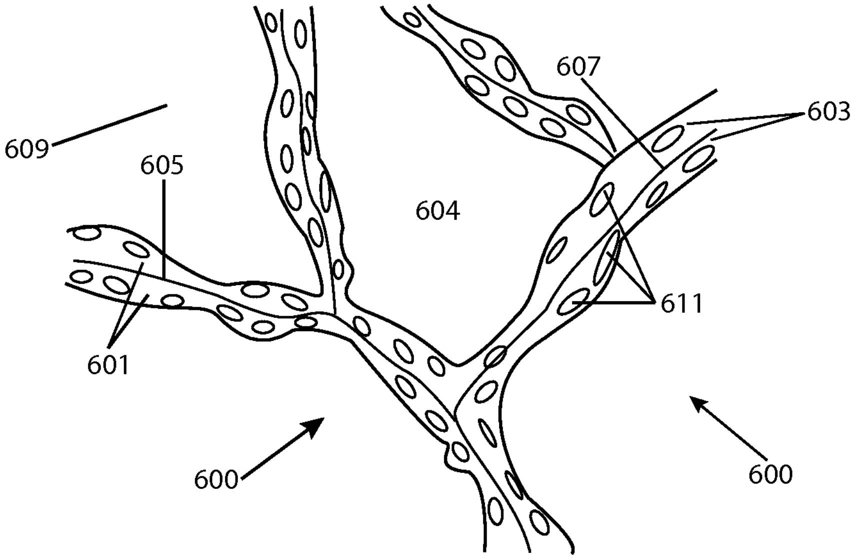
FIG. 6 is a partial top-view of exemplary bitable surface features of a CLEANCHEW, in accordance with additional aspects of the present invention.

FIG. 6 is a partial top-view of exemplary bitable surface features of a CLEANCHEW, in accordance with additional aspects of the present invention. Reticulated or interspersed grooves, such as those depicted as 600, comprise converging channel sides, such as those shown as converging channel side pairings 601 and 603. Such converging channel sides are within an outer CLEANCHEW material layer the outer surface of which is labeled 604, and may, when a tooth penetrates between where converging channel sides meet (such as that shown as convergences 605 and 607) separate sufficiently to permit a fluid from a contained cavity to flow outward (toward the viewer of the figure), and toward the penetrating tooth and gums in which the tooth may be embedded. The meeting points of the converging channel sides are more distant from the viewer of the picture than the main surface 609 of the outer layer of the CLEANCHEW—meaning that as converging side pairs such as 601 and 603 converge, to extend the example, at convergences 605 and 607, respectively, their surfaces slope inward, into the page, away from the viewer of the figure as they slope toward their convergences. Lining the outer surface of converging side pairings, such as 601 and 603, are scrubbing surface features, such as those shown as 611, which preferably comprise and are at least partially surface-covered by scrubbing and fluid absorbing projections, such as those discussed elsewhere in this application, and all of such features facilitate both scrubbing and the creation of temporary fluid-escape gaps during animal biting of the CLEANCHEW.

Figure 7:
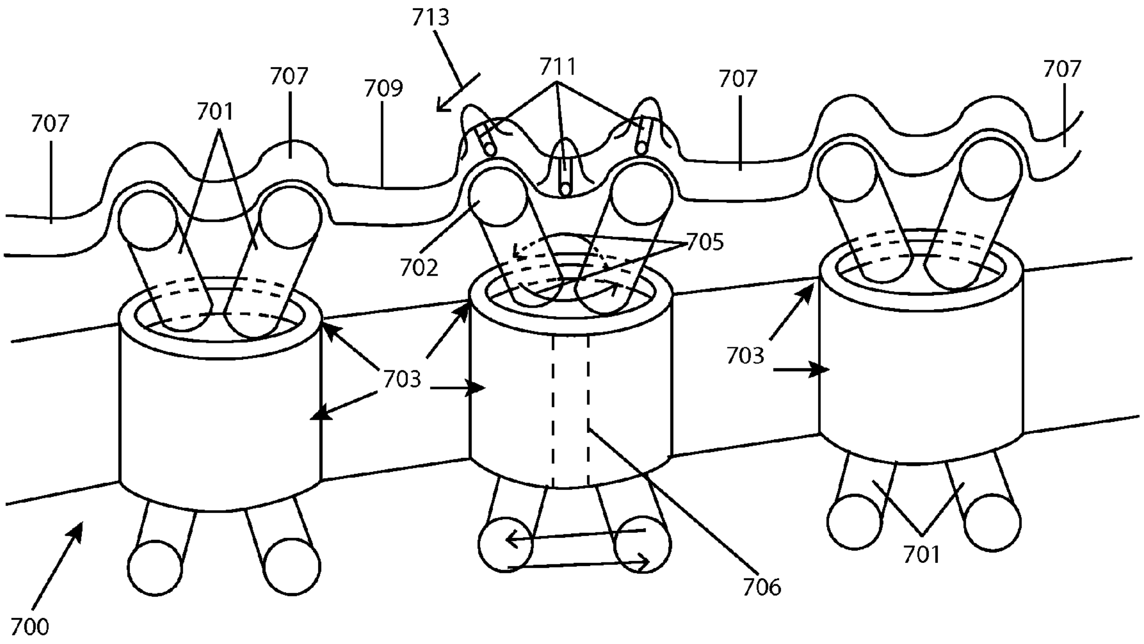
FIG. 7 is a side-view of part of a CLEANCHEW that includes biting- and/or motor-actuable movable structural members.

FIG. 7 is a side-view of aspects of a CLEANCHEW 700 that comprises biting- and/or motor-actuable movable structural members. Major biting- and/or motor-actuable movable structural members, such as those shown as examples 701, and which are generally cylindrical but with semi-spherical tops such as that shown as 702, extend from and are mounted to movable ball-and-socket, turret or swivel joints 703, about which they may rotate, as shown by exemplary rotational motion arrows 705 in the instance of a swivel joint (swiveling around a circular rotation axel, such as axel 706), or those major members may rotate in any spherical direction, in the instance of a ball-and-socket or turret joint. Major members 701 are buried beneath outer CLEANCHEW containing layer 707 (layer 707 being shown in vertical cross-section to avoid blocking the view of other aspects of the invention), which is preferably made of an elastomeric or flexible yet deformation-resistant material. Preferably, layer 707 is stretched over major members such as 701 with sufficient tension that the members are in contact with and variably shape (with their motion within joints 703) the surface layer 707. Such contact also aids in permitting biting on the outer surface of the layer 709 to drive motion of the major members such as 701. But, optionally or in addition, joints 703 may also be driven by servo/motors. Either way, the resulting moving surface shapes of layer 707 result in scrubbing and massaging of gums and teeth of an animal biting into layer 707 with its teeth. Minor biting- and/or motor-actuable movable structural members, such as the examples shown as 711, are preferably smaller than major members 701, and may be embedded in layer 707, and may move both in reaction to the same animal biting (which, as discussed above, may drive the motion of major members 701), and in reaction to motion of the major members, which may push minor members 711 upward and/or downward and/or rotate them about lever rotational axes. Minor member 711, therefore, are or create motion-variable scrubbing/massaging sub-features in layer 707, in which they are embedded. For example, if major members 701 move as shown in the second joint from the left of the illustration by motion arrows 705, the top of the left-most minor member may move into the page and to the left, in reaction, as shown by motion arrow 713.

I claim:

1. A dental hygiene device comprising at least one fluid-, gel-, paste- or liquid dentifrice-containing cavity and a layer comprising structures which further comprise openings which openings comprise fluid-, gel-, paste- or liquid-containing valves and which, when each of said valves is in a resting conformational state, substantially prevents fluid, gel, paste or liquid from escaping said cavity but which valves, when subject to a biting action by an animal, are temporarily opened due to said biting action and are substantially returned to said resting conformational state upon termination of said biting action and animal teeth are withdrawn from said openings; further comprising scrubbing features comprised within said valves.

2. The dental hygiene device of claim 1, in which said valves are of a bicuspid or tricuspid structure.

3. The dental hygiene device of claim 1, in which said valves are comprised of a substantially closed hole at an inside area of said layer, which substantially closed hole may open wider upon the introduction of mammalian teeth into said valves.

4. The dental hygiene device of claim 1, in which said scrubbing surface features further comprise scrubbing and fluid absorbing projections.

5. The dental hygiene device of claim 1, in which said scrubbing surface features may serve as spacers by creating gaps between part of said openings and a mammalian tooth through which space the fluid, gel, paste or liquid dentifrice may flow.

6. The dental hygiene device of claim 1, further comprising a refilling port, which (1) permits filling or refilling of said cavity with a fluid, gel, paste or liquid dentifrice due to a shape of said port that may create a seal with a spout of another fluid, gel, paste or liquid dentifrice container, but (2) prevents outflow of said fluid, gel, paste or liquid dentifrice from said cavity.

7. The dental hygiene device of claim 1, comprising the cavity or layer comprised of at least one malleable or elastomeric material encompassing a fluid, gel, paste or liquid agent that hardens, congeals, forms a clot, forms a plug or forms a seal upon sufficient contact with air or other surrounding gas or fluid which contact is caused by a breach of the device.

8. The dental hygiene device of claim 4, in which said projections are actuated by, but in a direction different from and not directly opposing, the motion of mammalian teeth biting into said openings of said device.

9. The dental hygiene device of claim 8, in which said actuation of said projections is caused by at least one spring.

10. The dental hygiene device of claim 9, in which each said at least one spring has multiple resting conformations.

11. The dental hygiene device of claim 10, in which said multiple resting conformations are differentially triggered by: (a) biting action, causing one of said conformations, and (b) the withdrawal or absence of biting action, causing another of said resting conformations.

12. The dental hygiene device of claim 1, in which a physical feature of said layer channels teeth into said openings if said teeth are pressed against said layer of said device.

13. The dental hygiene device of claim 1, further comprising in which said valves comprise a sealing layer that may be pierced by mammalian teeth of an animal biting said device.

14. The dental hygiene device of claim 13, further comprising in which said sealing layer is scored such that, when so pierced by mammalian teeth, said sealing layer creates at least one valve component.

15. The dental hygiene device of claim 1, further comprising in which said structures are placed in areas of the device more likely than others to be bitten by an animal biting said device.

16. The dental hygiene device of claim 1, in which said scrubbing surface features further comprise textures with flexible edges that drag across a mammalian tooth when biting said device.

17. A method for cleaning the teeth of a mammalian pet comprising the following steps: creating or acquiring a dental hygiene device, comprising at least one fluid-, gel-, paste- or liquid dentifrice-containing cavity and a layer comprising structures which further comprise fluid-, gel-, paste- or liquid-containing valves and which, when each of said valves is in a resting conformational state, substantially prevents fluid, gel, paste or liquid from escaping said cavity but which valves, when subject to a biting action by an animal, are temporarily opened due to said biting action and are substantially returned to said resting conformational state upon termination of said biting action and animal teeth are withdrawn from said valves; introducing said device to a mammalian animal; and permitting said animal to bite said device until said animal's teeth have been substantially cleaned; further comprising scrubbing features comprised within said valves.

* * * * *